United States Patent
Luce

(10) Patent No.: US 6,499,864 B2
(45) Date of Patent: Dec. 31, 2002

(54) LIGHTING DEVICE, AND METHOD OF OPERATING A LIGHTING DEVICE

(75) Inventor: Thomas Luce, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/825,277

(22) Filed: Apr. 3, 2001

(65) Prior Publication Data

US 2001/0040807 A1 Nov. 15, 2001

(30) Foreign Application Priority Data

Apr. 5, 2000 (DE) ......................................... 100 16 882

(51) Int. Cl.[7] ................................................ F21V 7/00
(52) U.S. Cl. ...................... 362/296; 362/297; 362/301; 362/280; 362/284; 362/551; 362/552; 362/554; 362/560; 385/901
(58) Field of Search ................................ 362/297, 554, 362/551, 560, 301, 302, 304, 305, 552, 346, 280, 284; 385/47, 900, 901, 115, 116, 123

(56) References Cited

U.S. PATENT DOCUMENTS

| 5,222,793 | A | * | 6/1993 | Davenport et al. ......... 362/346 |
| RE34,318 | E | * | 7/1993 | Davenport .................. 362/269 |
| 5,559,911 | A | * | 9/1996 | Forkner et al. ............. 362/556 |
| 6,220,740 | B1 | * | 4/2001 | Davenport et al. ......... 362/293 |
| 6,280,059 | B1 | * | 8/2001 | Ito et al. ..................... 362/269 |
| 6,283,623 | B1 | * | 9/2001 | Chinniah et al. ........... 362/282 |

FOREIGN PATENT DOCUMENTS

EP 0501669 B1 11/1995 ............ F21M/3/05

* cited by examiner

*Primary Examiner*—Stephen Husar
*Assistant Examiner*—Bertrand Zeade
(74) *Attorney, Agent, or Firm*—Ernestine C. Bartlett

(57) ABSTRACT

A lighting device with a light source and a first reflector which directs light provided by the light source towards at least two focal points in the operational state, is to be constructed such that the light path to one of the focal points can be obstructed without thermal problems arising. A second reflector is provided which diverts away at least partly the light guided by the first reflector to a first of the two focal points towards the second one of the two focal points, directly or indirectly, as desired.

22 Claims, 1 Drawing Sheet

LIGHTING DEVICE, AND METHOD OF OPERATING A LIGHTING DEVICE

Figure 1:
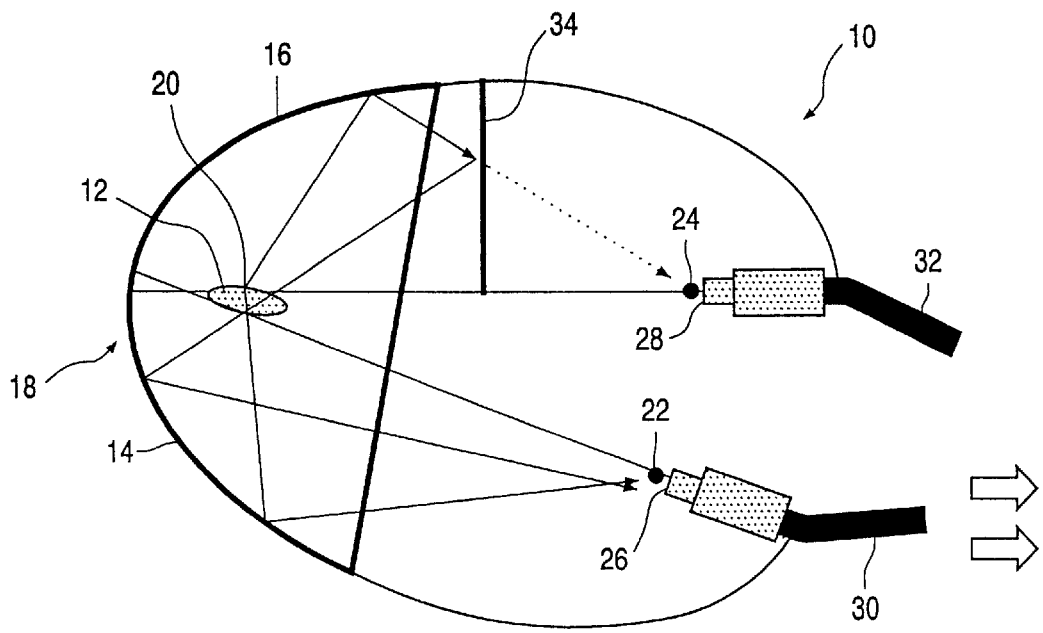

The invention relates to a lighting device with a light source and a first reflector which guides light originating from the light source to at least two focal points when in the operational state, as well as to a method of operating such a lighting device.

Such lighting devices and methods are known, for example, from EP 0 501 669 B1. They usually serve to split up the light originating from a light source into two or more beams, in particular for the purpose of feeding them into optical fibers. It is possible thereby to operate, for example, two motor vehicle headlamps which will then radiate light of exactly the same color and substantially the same intensity.

It is often necessary, however, in such lighting devices to "switch off" one of the light beams. This has been achieved by means of covering diaphragms until now, which close, for example, the emission opening of an optical fiber.

The use of diaphragms, however, requires that the diaphragm or the associated lighting device should be capable of absorbing the obstructed light, which often leads to thermal problems because of the fact that often high-intensity light sources are used in lighting devices of the kind described here.

Accordingly, the invention has for its object to provide a lighting device and a method of operating a lighting device of the kinds mentioned in the opening paragraph which render it possible to "switch off" a light source upon demand without the light which is not required leading to thermal problems.

This object is achieved by means of a device with the characteristics of claim 1 and a method with the characteristics of claim 9. Advantageous embodiments and modifications are defined in the dependent claims.

The invention thus presents a lighting device of the type indicated which comprises at least a second reflector. This reflector is designed such that it is capable of diverting away the light which was guided to a first of the two focal points by the first reflector at least partly towards the second one of the two focal points, if so desired. This diversion may take place directly or indirectly.

The invention thus provides a method of the type indicated by which the light guided to the first of the two focal points is directly or indirectly, as desired, diverted at least partly to the second one of the two focal points.

Such a device is of a particularly simple construction, and such a method is particularly easy to implement, when the second reflector is a mirror which can be displaced or pivoted into the radiation path of the light from the light source to the first focal point, or can be rotated into this radiation path. Alternatively, the second reflector may be an electronic mirror, or a mirror whose mirroring properties can be changed in some other way, which is preferably positioned in the radiation path of the light from the light source to the first focal point, which mirror can be switched over between a reflection and a transmission operation. It then suffices for switching on and off merely to operate the mirror in the corresponding manner, i.e. to displace, pivot, rotate, or switch over the mirror.

Means for transmitting the radiation further may be provided in the two focal points. Preferably, light input openings of light waveguides or optical fibers are provided in or adjacent the two focal points. It is particularly easy in this manner to pass on the light beam divided by the radiation divider of the lighting device to desired locations. It is obvious that alternative radiation paths such as, for example, mirror arrangements or optical systems may be provided before the light is fed into a light waveguide or an optical fiber.

Preferably, the second reflector is constructed such that it prevents at least substantially the input of light into one of the light input openings, in particular into the light input opening arranged at the first focal point, in the case of the optional diversion of light.

A further transmission of light from the first focal point can be prevented in a particularly simple manner thereby.

The entire arrangement has a particularly simple construction if the first reflector is comprised of two half ellipsoids, each with two focal points, said half ellipsoids being arranged such that they have one focal point in common, in which the light source is positioned.

If the second reflector is positioned in the geometric center of one of the two half ellipsoids in the case of the optional light diversion, substantially all light will be guided back into the common focal point and thus entirely into the second focal point belonging to the second half ellipsoid. It is similarly possible to arrange the second reflector in or adjacent the first focal point in the case of the optional light diversion. In this case, however, the reflector cannot be introduced simply rectilinearly, as in the alternative mentioned above, but should be exactly adjusted. In particular, a non-planar reflector shape may alternatively be used for the second reflector. It was surprisingly found in practice that the latter alternative has a better light efficiency than the former alternative, which is theoretically superior.

It is obvious that more than two focal points can be provided with light from the one light source, provided the first reflector has a suitable construction. It is also possible in particular to install several reflectors which correspond to the second reflector and which are each associated with the various focal points.

The invention has the major advantage that the light not required in a certain location is not converted into useless heat, but instead is at least partly directly or indirectly guided to one or several other focal points, in particular by means of reflection at the first reflector, in which other focal points it enters, for example, optical fibers and can be used for enhancing the luminous intensity.

Figure 2:
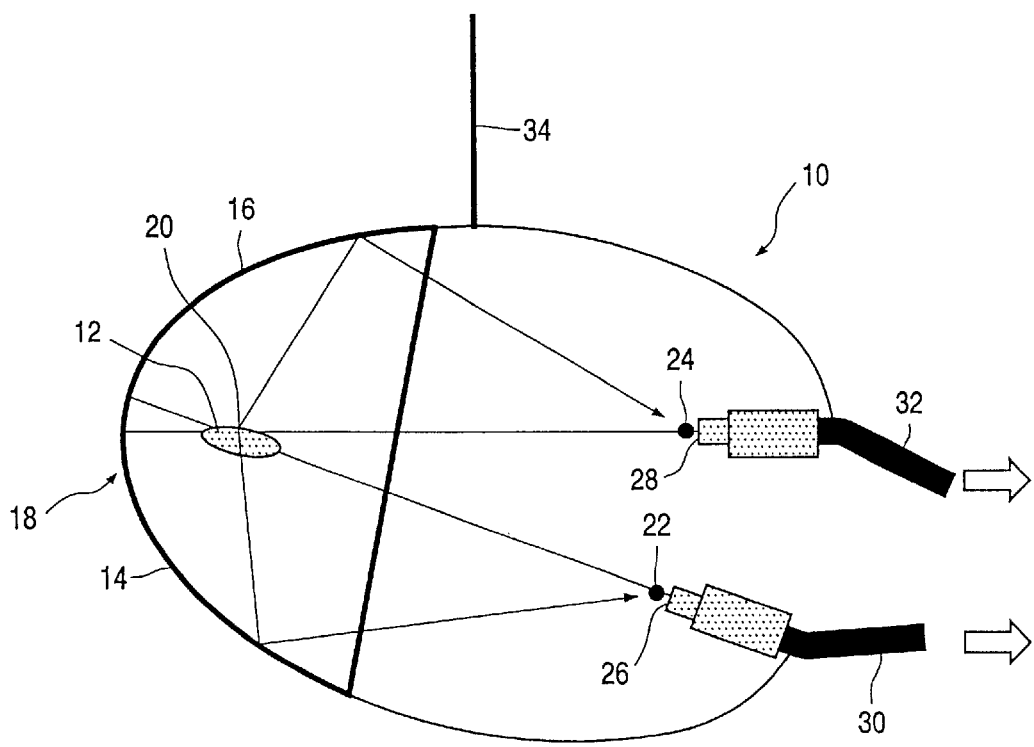

Further details and advantages of the invention will become apparent from the following description, which is given purely by way of example and to which the invention is by no means limited, of an embodiment with reference to the drawing, in which:

FIG. 1 is a diagrammatic picture of a lighting device according to the invention with a first and a second reflector, which second reflector has been introduced into the radiation path of the light originating from the light source towards a focal point of the first reflector, and FIG. 2 shows the lighting device of FIG. 1 with the second reflector removed from the radiation path.

FIGS. 1 and 2 show a lighting device referenced 10 in its entirety and comprising a light source 12 and a first reflector 18 consisting of two half ellipsoids 14 and 16. The first reflector in this embodiment has a total of three focal points 20, 22, and 24, the light source 12 being arranged in the common focal point 20 of the two half ellipsoids 14 and 16. The light input openings 26 and 28 of two optical fibers 30 and 32 are present in the two other focal points 22 and 24, said light input openings 26 and 28 being drawn shortly behind the focal points 22 and 24 for reasons of clarity in the drawing, as seen in the direction of radiation of the light from the light source to the light input openings.

The optical fibers 30 and 32 may issue at various locations, for example in a headlight lantern of a land, water, or air transport vehicle.

A second reflector 34 is present for providing a possibility of controlling the light input into one of the two optical fibers during operation of the light source 12, which reflector in this embodiment can be moved approximately in the geometric center of the half ellipsoid 16 into the radiation path of the light radiated by the light source 12 towards the input opening 28 of the optical fiber 32, where it reflects the incident light such that it reaches the other input opening 26 via the first reflector. The second reflector may be, for example, a normal, planar mirror. FIG. 1 shows the second reflector 34 in the position in which it blocks the radiation path, and FIG. 2 shows the second reflector in a position withdrawn from the radiation path.

Various modifications and further embodiments are conceivable within the scope of the invention, relating, for example, to the shape and arrangement of the second reflector or the construction of the first reflector and the number of focal points. It is essential for the invention, however, that the light not required in one focal point is at least partly diverted away to another focal point, where it can be usefully employed.

What is claimed is:

1. A lighting device (10) with a light source (12) and a first reflector (18) which guides light provided by the light source (12) to at least two focal points (22, 24) when in the operational state, characterized in that at least one second reflector (34) is provided for optionally diverting away at least partly, directly or indirectly, the light which was guided by the first reflector (18) to a first of the two focal points (24) towards the second one of the two focal points (22, 24).

2. A lighting device (10) as claimed in claim 1, characterized in that light input openings (26, 28) of optical fibers (20, 32) are provided in or adjacent the two focal points (22, 24) to which the first reflector (18) guides the light generated by the light source (12) when in the operational state.

3. A lighting device (10) as claimed in claim 2, characterized in that the second reflector (34) is constructed such that it prevents at least substantially the input of light into one of the light input openings (28) during the optional diversion of light.

4. A lighting device (10) as claimed in any one of the claims 1 to 3, in which the first reflector (18) is built up from two half ellipsoids (14, 16), each with two focal points (20, 22; 20, 26), characterized in that the half ellipsoids are arranged such that they have one focal point (20) in common, in which focal point (20) the light source (12) is positioned.

5. A lighting device (10) as claimed in claim 4, characterized in that the at least one second reflector (34) is positioned in the geometric center of one of the two half ellipsoids (14, 16) during the optional diversion of light.

6. A lighting device as claimed in claim 1, characterized in that the at least one second reflector is positioned in or adjacent that focal point of the first reflector which should receive no light in the case of the optional diversion of light.

7. A lighting device (10) as claimed in claim 1, characterized in that the at least one second reflector is a mirror (34) which can be displaced or pivoted into the ration path of the light from the light source (12) to the first focal point (24), or which can be rotated into this radiation path.

8. A lighting device as claimed in claim 1 characterized in that the at least one second reflector is an electronic mirror which is preferably arranged in the radiation path of the light from the light source to the first focal point, which mirror can be switched over between a reflection operation and a transmission operation.

9. A method of operating a lighting device with a light source and a first reflector which guides light provided by the light source to at least two focal points when in the operational state, characterized m that the light guided to a first of the two focal points is divertible away at least partly towards the second one of the two focal points.

10. A method as claimed in claim 9, characterized in that a second reflector is displaced or pivoted into the radiation path of the light from the light source to the first focal point, or is rotated into this radiation path, for the purpose of diverting away the light guided to the first focal point towards the second focal point.

11. A method as claimed in claim 9, characterized in that an electronic mirror positioned in the radiation path of the light from the light source to the first focal point of the first reflector is switched over from a transmission operation to a reflection operation for the purpose of diverting away the light guided to the first focal point towards the second focal point.

12. A lighting device (10) comprising
   at least one light source (12);
   a first reflector (18) for guiding light provided by the light source (12) to at least two focal points (22, 24) when in the operational state, and
   at least one second reflector (34) for optionally diverting away at least partly, directly or indirectly, the light which was guided by the first reflector (18) to a first of the two focal points (24) towards the second one of the two focal points (22, 24).

13. The device (10) of claim 12, further comprising optical fibers (20, 32) in or adjacent the two focal points (22, 24) having light input openings (26, 28) for receiving light guided by the first reflector (18) from the light source (12).

14. The device (10) of claim 13, wherein the second reflector (34) comprises means for preventing at least substantially the input of light into one of the light input openings (28) during the optional diversion of light.

15. The lighting device (10) of claim 11, in which the first reflector (18) is built up from two half ellipsoids (14, 16), each with two focal points (20, 22; 20, 26), wherein the half ellipsoids are arranged such that they have one focal point (20) in common, in which focal point (20) the light source (12) is positioned.

16. The lighting device (10) of claim 15, wherein the at least one second reflector (34) is positioned in the geometric center of one of the two half ellipsoids (14, 16) during the optional diversion of light.

17. The lighting device of claim 12, wherein the at least one second reflector is positioned in or adjacent that focal point of the first reflector that should receive no light in the case of the optional diversion of light.

18. The lighting device (10) of claim 12, wherein the at least one second reflector is a mirror (34) that is displaceable, pivotable, or rotatable into the radiation path of the light from the light source (12) to the first focal point (24).

19. The lighting device of claim 12, wherein the at least one second reflector is an electronic mirror, which is preferably arranged in the radiation path of the light from the light source to the first focal point, which mirror is switchable between a reflection operation and a transmission operation.

20. A method of operating a lighting device comprising:
   supplying light from a light source;
   in an operational state, guiding light from the light source to at least two focal points using a first reflector; and
   responsive to an optional actuation, diverting the light guided to a first of the two focal points at least partly away towards the second one of the two focal points.

21. The method of claim 20, wherein the diverting comprises displacing, pivoting, or rotating a second reflector into the radiation path of the light from the light source to the first focal point, for the purpose of diverting away the light guided to the first focal point towards the second focal point.

22. The method of claim 20, wherein the diverting comprises switching an electronic mirror, positioned in the radiation path of the light from the light source to the first focal point of the first reflector, from a transmission operation to a reflection operation for the purpose of diverting away the light guided to the first focal point towards the second focal point.

* * * * *